United States Patent
Fang et al.

(10) Patent No.: US 10,827,203 B2
(45) Date of Patent: Nov. 3, 2020

(54) SET-TOP BOX WITH INTERACTIVE PORTAL AND SYSTEM AND METHOD FOR USE OF SAME

(71) Applicant: Enseo, Inc., Richardson, TX (US)

(72) Inventors: William C. Fang, Plano, TX (US); Edward H. Wolfe, Plano, TX (US)

(73) Assignee: Enseo, Inc., Plano (*) Notice: Subject to any disclaimer, the term of this patent is extended or adjusted under 35 U.S.C. 154(b) by 0 days.

(21) Appl. No.: 16/436,341

(22) Filed: Jun. 10, 2019

(65) Prior Publication Data

US 2019/0297354 A1 Sep. 26, 2019

Related U.S. Application Data

(63) Continuation of application No. 15/899,263, filed on Feb. 19, 2018, now Pat. No. 10,321,165, which is a continuation-in-part of application No. 15/824,766, filed on Nov. 28, 2017, now Pat. No. 10,123,056, which is a continuation of application No. 15/417,554, filed on Jan. 27, 2017, now Pat. No. 9,832,489, which is a continuation of application No.
(Continued)

(51) Int. Cl.
| H04N 21/214 | (2011.01) |
| H04N 21/436 | (2011.01) |
| H04N 21/478 | (2011.01) |
| H04N 21/81  | (2011.01) |
| H04N 21/25  | (2011.01) |
| H04N 21/41  | (2011.01) |
| H04L 12/28  | (2006.01) |
| H04N 21/262 | (2011.01) |

(52) U.S. Cl.
CPC ....... *H04N 21/2143* (2013.01); *H04L 12/283* (2013.01); *H04L 12/2803* (2013.01); *H04N 21/25* (2013.01); *H04N 21/262* (2013.01); *H04N 21/4131* (2013.01); *H04N 21/436* (2013.01); *H04N 21/43615* (2013.01); *H04N 21/478* (2013.01); *H04N 21/8126* (2013.01); *H04N 21/8146* (2013.01); *H04N 21/8153* (2013.01)

(58) Field of Classification Search
CPC ............. H04N 21/2143; H04N 21/214; H04N 21/436; H04N 21/478; H04N 21/81; H04L 12/2803; H04L 12/283
See application file for complete search history.

(56) References Cited

U.S. PATENT DOCUMENTS

| 5,661,517 A | 8/1997 | Budow et al. |
| 9,088,828 B2 | 7/2015 | Ogle et al. |

(Continued)

*Primary Examiner* — Sumaiya A Chowdhury
(74) *Attorney, Agent, or Firm* — Scott Griggs; Griggs Bergen LLP (57) ABSTRACT

A set-top box with an interactive portal and system and method for use of the same are disclosed. In one embodiment of the set-top box, the set-top box includes a housing that secures a signal input, a signal output, a processor, a transceiver, and memory therein in an interconnected bus architecture. The set-top box receives a status signal via the transceiver from an amenity. The set-top box then generates an interactive portal that includes a status icon relating to the status signal and a management icon relating to commanding the amenity or initiating a service request.

19 Claims, 5 Drawing Sheets

Related U.S. Application Data

15/074,067, filed on Mar. 18, 2016, now Pat. No. 9,560,388, which is a continuation of application No. 14/803,428, filed on Jul. 20, 2015, now Pat. No. 9,326,009, which is a continuation of application No. 14/294,123, filed on Jun. 2, 2014, now Pat. No. 9,088,828.

(60) Provisional application No. 62/555,303, filed on Sep. 7, 2017, provisional application No. 61/829,932, filed on May 31, 2013.

(56) References Cited

U.S. PATENT DOCUMENTS

| | | | |
|---|---|---|---|
| 9,326,009 | B2 | 4/2016 | Ogle et al. |
| 9,490,997 | B2 * | 11/2016 | Sasaki ................ H04L 12/2816 |
| 9,560,388 | B2 | 1/2017 | Ogle et al. |
| 9,832,489 | B2 | 11/2017 | Ogle et al. |
| 10,321,165 | B2 | 6/2019 | Fang et al. |
| 2002/0078459 | A1 * | 6/2002 | McKay .................... G06F 1/16 725/78 |
| 2004/0019513 | A1 | 1/2004 | Colalancia |
| 2007/0050197 | A1 | 3/2007 | Efron |
| 2008/0319807 | A1 | 12/2008 | Weiss |
| 2010/0211489 | A1 | 8/2010 | Zhang |
| 2010/0250707 | A1 | 9/2010 | Dailey |
| 2011/0302614 | A1 * | 12/2011 | Padmanabhan ...... H04N 21/812 725/61 |
| 2011/0314492 | A1 | 12/2011 | Cassidy |
| 2012/0137320 | A1 * | 5/2012 | Mugulavalli ........ H04N 21/222 725/25 |
| 2012/0291068 | A1 * | 11/2012 | Khushoo ................ H04L 12/282 725/38 |
| 2013/0014136 | A1 * | 1/2013 | Bhatia .................. H04N 21/252 725/9 |
| 2014/0278642 | A1 * | 9/2014 | Robinson ......... G06Q 10/06311 705/7.15 |
| 2017/0046650 | A1 | 2/2017 | Mulji |
| 2017/0142449 | A1 | 5/2017 | Ogle et al. |

* cited by examiner

SET-TOP BOX WITH INTERACTIVE PORTAL AND SYSTEM AND METHOD FOR USE OF SAME

PRIORITY STATEMENT & CROSS-REFERENCE TO RELATED APPLICATIONS

This application is a continuation of co-pending U.S. patent application Ser. No. 15/899,263 entitled "Set-Top Box with Interactive Portal and System and Method for Use of Same" filed on Feb. 19, 2018, in the names of William C. Fang et al., now U.S. Pat. No. 10,321,165, issued on Jun. 11, 2019; which claims priority from U.S. Patent Application Ser. No. 62/555,303 entitled "Set-Top Box with Interactive Portal and System and Method for Use of Same" filed on Sep. 7, 2017, in the names of Vanessa Ogle et al.; which is hereby incorporated by reference for all purposes. This application is also a continuation-in-part of U.S. patent application Ser. No. 15/824,766 entitled "Set-Top Box with Interactive Portal and System and Method for Use of Same" filed on Nov. 28, 2017, in the names of Vanessa Ogle et al., now U.S. Pat. No. 10,123,056 issued on Nov. 6, 2018; which is a continuation of U.S. patent application Ser. No. 15/417,554 entitled "Set-Top Box with Interactive Portal and System and Method for Use of Same" filed on Jan. 27, 2017, in the names of Vanessa Ogle et al., now U.S. Pat. No. 9,832,489 issued on Nov. 28, 2017; which is a continuation of U.S. patent application Ser. No. 15/074,067 entitled "Set-Top Box with Interactive Portal and System and Method for Use of Same" filed on Mar. 18, 2016, in the names of Vanessa Ogle et al., now U.S. Pat. No. 9,560,388 issued on Jan. 31, 2017; which is a continuation of U.S. patent application Ser. No. 14/803,428 entitled "Set-Top Box with Interactive Portal and System and Method for Use of Same" filed on Jul. 20, 2015, in the names of Vanessa Ogle et al, now U.S. Pat. No. 9,326,009 issued on Apr. 26, 2016; which is a continuation of U.S. patent application Ser. No. 14/294,123 entitled "Set-top Box with Interactive Portal and System and Method for Use of Same" filed on Jun. 2, 2014, in the names of Vanessa Ogle et al., now U.S. Pat. No. 9,088,828 issued on Jul. 21, 2015; which claims priority from U.S. Patent Application Ser. No. 61/829,932 entitled "On-Screen Display" filed on May 31, 2013 in the name of Vanessa Ogle; all of which are hereby incorporated by reference for all purposes.

TECHNICAL FIELD OF THE INVENTION

This invention relates, in general, to set-top boxes and, in particular, to set-top boxes with interactive portals and systems and methods for use of the same that provide additional functionality to residences, as an example.

BACKGROUND OF THE INVENTION

To many individuals, a television is more than just a display screen, rather it is a doorway to the world, both real and imaginary, and a way to experience new possibilities and discoveries. To enhance the experience, consumers are desiring televisions with enhanced content in an easy-to-use platform. As a result of such consumer preferences, the quality of content and ease-of-use of televisions are frequent differentiators in determining the experience. Accordingly, there is a need for improved systems and methods for providing televisions with enhanced content in an easy-to-use platform for uses in residences and other locations.

SUMMARY OF THE INVENTION

It would be advantageous to achieve a set-top box that would improve upon existing limitations in functionality. It would also be desirable to enable a computer-based electronics and software solution that would provide a television or other display with enhanced content in an easy-to-use platform in a residential environment or in another environment. To better address one or more of these concerns, a set-top box with an interactive portal and system and method for use of the same are disclosed. In one embodiment of the set-top box, the set-top box includes a housing that secures a signal input, a signal output, a processor, a transceiver, and memory therein in an interconnected bus architecture. The set-top box receives a status signal via the transceiver from an amenity. The set-top box then generates an interactive portal that includes a status icon relating to the status signal and a management icon relating to commanding the amenity or initiating a service request. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
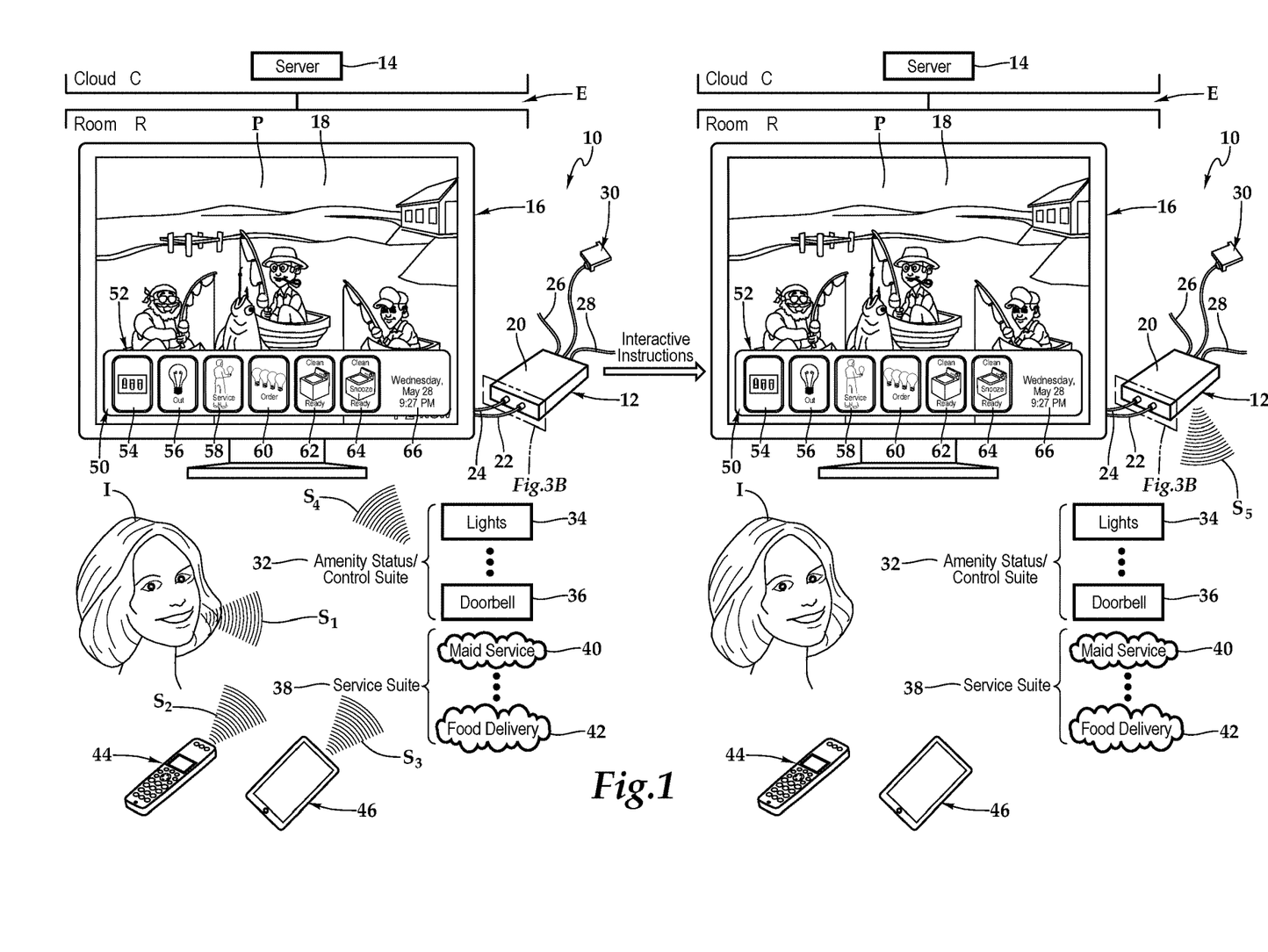
FIG. 1 is a schematic diagram depicting one embodiment of a system utilizing set-top boxes with interactive portals being employed in a residential environment, according to the teachings presented herein.

Referring initially to FIG. 1, therein is depicted one embodiment of a system 10 utilizing a set-top box 12 with an interactive portal. The set-top box 12 may be utilized in an environment E, which may be a single family residence such as a house, duplex, or townhome. Alternatively, the environment E may be a hospitality lodging establishment or more generally, hospitality property, which may be a furnished multi-family residence, dormitory, lodging establishment, hotel, hospital, or other multi-unit environment. The set-top box 12 is located in a room R of the environment E and is communicatively disposed with various amenities associated with the environment E. The set-top boxes 12 may be located in communication with a server 14, which may be co-located within the environment E or alternatively, as shown, located within a cloud C.

As illustrated, in one embodiment, within the room R, the system 10 includes the set-top box 12 and a display 16 having a screen 18. The display 16 may be a television or any electronic visual display device, for example. The set-top box 12 includes a housing 20. A connection, which is depicted as an HDMI connection 22, connects the set-top box 12 at the housing 20 to the display 16. Other connections include a power cable 24 coupling the set-top box 12 to a power source, a coaxial cable 26 coupling the set-top box 12 to an external cable source, and a category five (Cat 5) cable 28 coupling the set-top box 12 to an external source. As shown, the set-top box 12 may include a dongle 30 providing particular technology and functionality extensions thereto. That is, the set-top box 12 may be a set-top box-dongle combination in one embodiment. More generally, it should be appreciated that the cabling connected to the set-top box 12 will depend on the environment and application, and the cabling connections presented in FIG. 1 are depicted for illustrative purposes. Further, it should be appreciated that the positioning of the set-top box 12 will vary depending on environment and application and, with certain functionality, the set-top box 12 may be placed more discretely behind the display 16.

An amenity status/control suite 32 represents the status and control of various amenities, such as residential amenities, associated with the individual I in the environment E. The various amenities may include lights 34, a thermostat, shades, and a doorbell 36, for example. The set-top box 12 may also be communicatively disposed with these various amenities, which may also include a CD/DVD player, and a radio tuner. The set-top box 12 is communicatively disposed with these various amenities. In one embodiment, the set-top box 12 is communicatively disposed with the amenities of the amenity status/control suite 32 in order to, in part, receive status updates from the amenities and control the amenities. A service suite 38 represents a set of services associated with the individual I living or staying in the environment E. The various guest services may include maid service 40, pool service, and food delivery service 42, for example. The set-top box 12 is communicatively disposed with these various services to, in part, receive status updates about the various services and to make service inquiries and requests, for example.

In one embodiment, the individual I may issue voice commands, such as signaling $S_1$, from a distance to the set-top box 12 in order to control the display 16 via the set-top box 12, for example, or interact with the amenity status/control suite 32 or the service suite 38. A television remote control 44 includes an array of buttons for adjusting various settings such as television channel and volume. In one embodiment, the television remote control 44 may be a consumer infrared (IR), Bluetooth or other wireless-protocol-based device configured as a small wireless handheld object that issues commands, such as signaling $S_2$, from a distance to the set-top box 12 in order to control the display 16 via the set-top box 12, for example, or interact with the amenity status/control suite 32 or the service suite 38. A proximate wireless-enabled interactive programmable device 46 is illustrated as a tablet computer having a touch screen display. Although a tablet computer is depicted, the proximate wireless-enabled interactive programmable device 46 may be a personal computer, laptop, smart phone, smart speaker, or smart watch, for example. The proximate wireless-enabled interactive programmable device 46 issues commands, such as signaling $S_3$, from a distance to the set-top box 12 in order to control the display 16 via the set-top box 12, for example, or interact with the amenity status/control suite 32 or the service suite 38.

In one operational embodiment, in response to receiving a status update, via signaling $S_4$, from the amenity status/control suite 32, and, in particular, from lights 34, the set-top box 12 has generated an interactive portal 50. Alternatively, in another implementation, the individual I may press a service button on a device, such as the television remote control 44 or the proximate wireless-enabled interactive programmable device 46, or navigate a menu to cause the generation of the interactive portal 50, which may be overlayed or superimposed on the program P on the display 16, in one embodiment, or partially or fully integrated therewith. The interactive portal 50 includes interactive icons 52, and more particularly icons 54, 56, 58, 60, 62, and 64. Additionally, informational presentation 66 is provided, which includes date and time. It should be appreciated that any number or configuration of interactive icons 52 may be presented, including an entire screen of interactive icons 52 or a scrolling feature allowing a defined space to provide many sheets of interactive icons 52. By way of example and not by way of limitation, the interactive icons 52 may include status icons, control icons, and service icons relating to lighting, security alarm systems, garage doors, front doors, hot-water heaters, sump pumps, door bells, pet bowls, HVAC systems, and entry points, for example.

In the embodiment shown, the icon 54 provides interaction with the lighting system to control the lights in the environment E. The icon 56, a status icon initially generated from receipt of the signal $S_4$ at the set-top box 12, indicates that a light bulb needs replacement. The icon 58 is a management icon providing for a service request, and actuation of the icon 58 by way of the individual's voice command, the remote control 44, or the proximate wireless-enabled interactive programmable device 46, for example, generates, by way of the set-top box 12, a maintenance request in substantially real time. The maintenance request may be sent to household member or other individual charged with lightbulb replacement. The icon 60, in this instance, indicates that the household is out of light bulbs and actuation of the icon 60, which executes a product fulfillment, orders the appropriate lightbulb from a third-party service. The icon 62, a status icon, indicates a load of laundry is now complete in the washer. The icon 64 provides a snooze function for the load of laundry and sets a reminder to appear on the display 16 at the end of the program P, for example.

As shown, the individual I views the interactive portal 50, including the icon 56. The individual I utilizes the proximate wireless-enabled interactive programmable device 46 to send an interactive instruction in the form of a command to the set-top box to actuate icon 58 to order maintenance of the lightbulb by, in one implementation, adding the lightbulb replacement to a "honey-do" list or causing the set-top box 12 to send a text message, using signaling $S_5$ to the person responsible for lightbulb replacement. The individual I also sends an interactive instruction in the form of a command to snooze the clean laundry in the washing machine until the program P is concluded. Signaling $S_5$ is an example of the communication and signaling between the set-top box 12 and the amenity/control suite 32 in order to, for example, receive status updates from various amenities and control the various amenities. The control may relate to changing the status or state of an amenity or adjusting a parameter such as light or temperature.

The icons, including the status icons and the management icons, may be words, graphical representations or a combination of words and graphical representations, for example. In one implementation, the icons and information presentations may be language independent. In this manner, the set-top box 12 is providing various environmental support without the need for additional technology. Further, complex systems that require additional training are not needed as the systems and methods presented herein are intuitive.

Figure 2A:
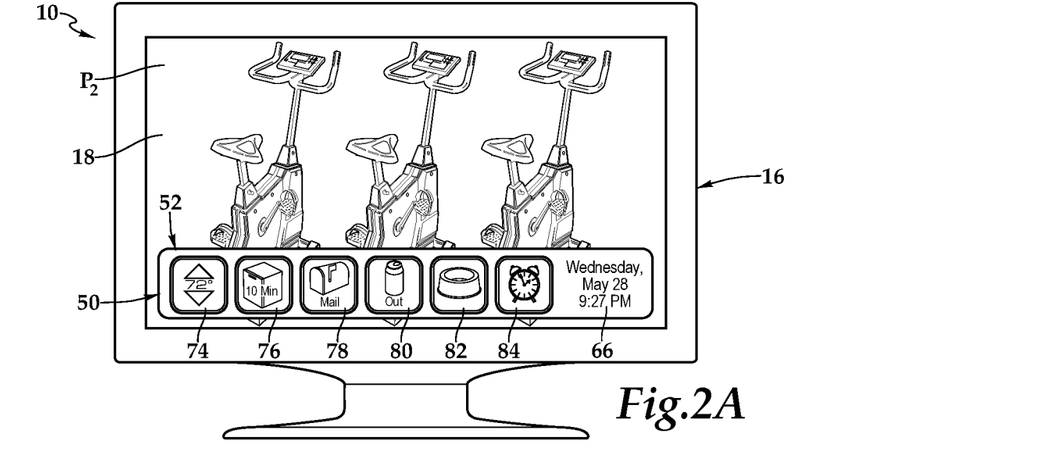
FIG. 2A is a schematic diagram depicting one embodiment of a display depicted in FIG. 1, under control of the set-top box, exhibiting exemplary enhanced functionality.
Figure 2B:
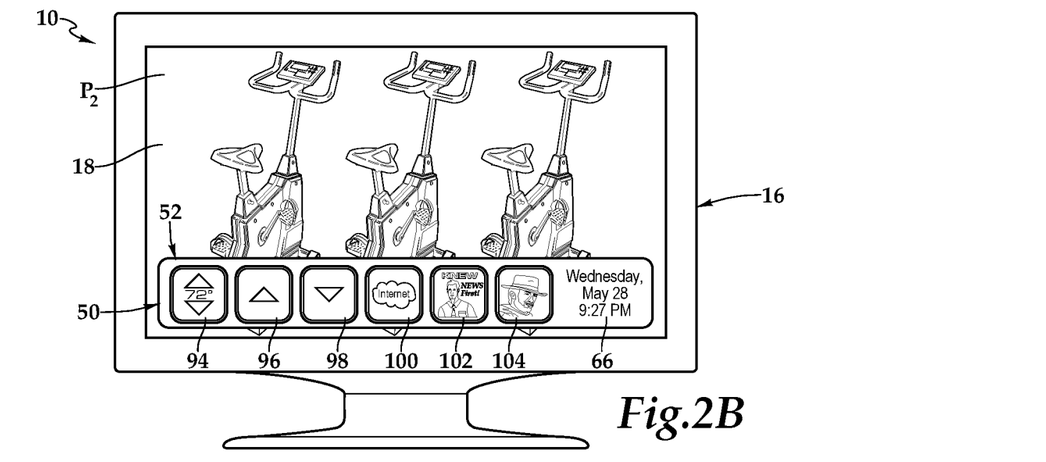
FIG. 2B is a schematic diagram depicting one embodiment of the display depicted in FIG. 1, under control of the set-top box, exhibiting exemplary enhanced functionality.
Figure 2C:
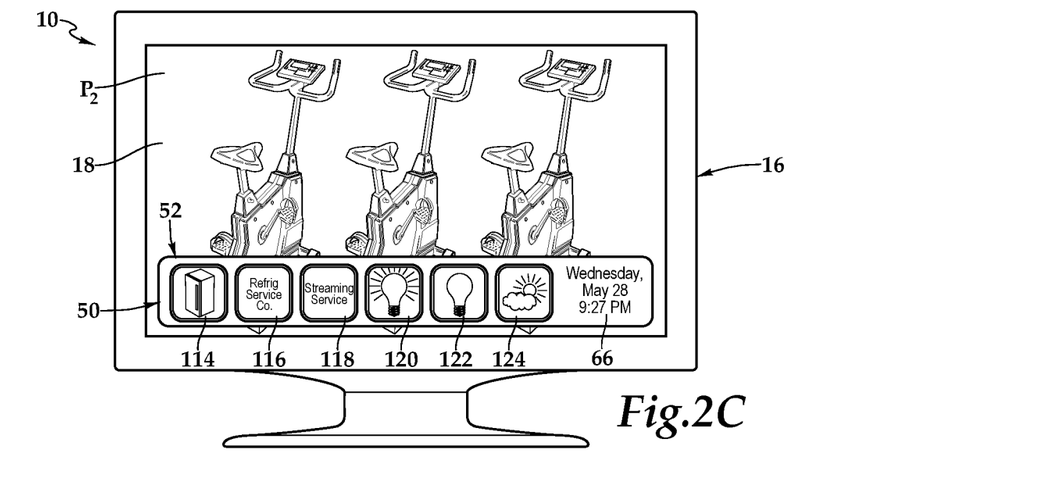
FIG. 2C is a schematic diagram depicting one embodiment of the display depicted in FIG. 1, under control of the set-top box, exhibiting exemplary enhanced functionality.

In the embodiments presented in FIGS. 2A, 2B and 2C, the icons may represent status icons and management icons, for example. The status icons provide a description of the state of the amenity. The management icon may be a command request that operates the amenity or a service request that solicits a third-party (e.g., non-set-top box) order selected from the group consisting of repair, maintenance, and product fulfillment. By way of example and not by way of limitation, with reference to FIG. 2A, the display 16 includes the screen which is showing the program $P_2$. The interactive portal 50 includes an icon 74 providing the temperature, an icon 76 indicating the dishwasher has 10 minutes remaining in a cleaning cycle, an icon 78 indicating mail has arrived, an icon 80 indicating the refrigerator is out of beverages, an icon 82 indicating the dog bowl is out of water, and an icon 84 representing an alarm. With reference to FIG. 2B, the interactive portal 50 includes an icon 94 showing the temperature, icons 96, 98 to increase or decrease the temperature, an icon 100 to launch a service request for the Internet, an icon 102 to change channels to a news program, and an icon 104 to change channels to a drama. Continuing with the range of examples of icons 50, with reference to FIG. 2C, icon 114 shows a refrigerator and indicates the refrigerator is not cooling and may require maintenance. An icon 116 provides contact information for a refrigerator service company and permits an individual I to contact the refrigerator service company to repair the refrigerator. An icon 118 provides access to a streaming service. An icon 120 displays a lightbulb and permits the lights in the room to be brightened. An icon 122 displays a lightbulb also and permits the lights in the room to be dimmed. An icon 124 provides information about the weather.

Figure 3:
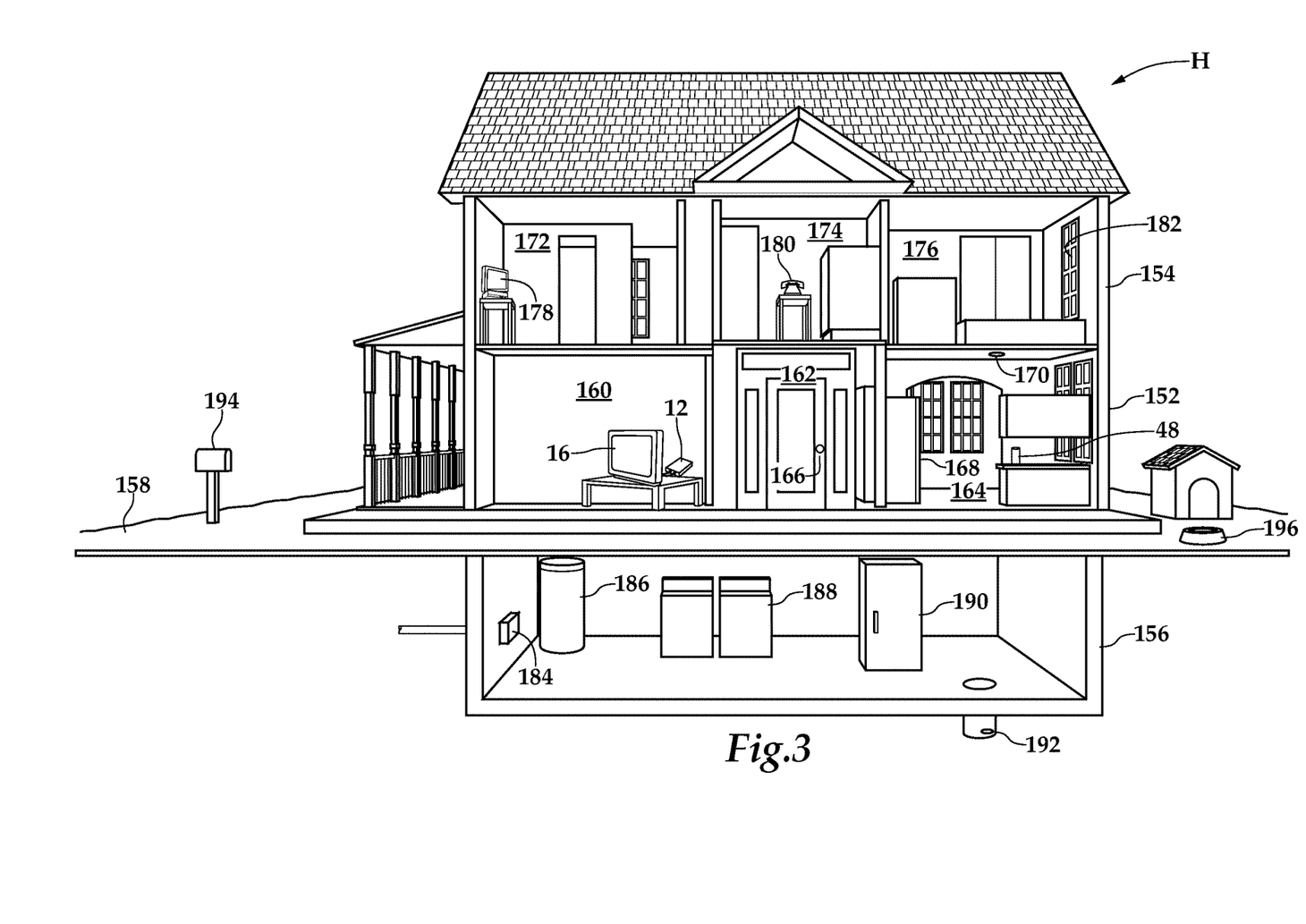
FIG. 3 is a schematic diagram of a home depicted as a residence wherein the system is being advantageously utilized

Referring now to FIG. 3, the environment E is depicted as a single family residence and more particularly, home H utilizing one embodiment of the systems presented herein. The home H includes a first floor 152, a second floor 154, a basement 156, and a yard 158. A living room 160, an entryway 162, and a kitchen 164 are located on the first floor 152. In the living room 160, the display 16 receives programming through the set-top box 12 which may provide cable programming or satellite programming, for example.

Sensors are associated with various household amenities throughout the first floor 152, second floor 154, basement 156, and yard 158 of the home H. The sensors may also be partially or fully integrated into the amenities. In one embodiment, each sensor or amenity is operable to transmit a wireless signal in response to an event occurrence associated with the respective household amenity. As will be discussed further below, the event may be the ringing of a doorbell, the detection of water, or the detection of a low battery, for example. Further, in one embodiment, each sensor is operable to transmit a wireless signal in response to a status request or periodically. The set-top box 12 receives the wireless signals from the sensors and generates the aforementioned interactive portal 50. Such messaging provides a television viewer with the ability to monitor the status of home H and determine home awareness while engaged in watching television programming.

By way of example, the entryway 162 includes a front door 166 having a doorbell associated therewith. A sensor connected to the doorbell senses when the doorbell is rung and sends a corresponding wireless signal to the set-top box, which incorporates an icon representative of "DOORBELL" into the interactive portal. The television viewer or viewers see the icon and are aware of the ringing doorbell while watching the television in the living room 160. This is particularly useful in instances where the television viewers have the television volume excessively high or the doorbell amplifier and speaker is sufficiently removed from the living room 160.

By way of further example, the kitchen 164 includes a number of household amenities such as a refrigerator 168 that is equipped with a sensor that detects the status of the refrigerator door, i.e., open or closed. When the refrigerator door is open for more than 30 seconds, for example, a wireless signal is transmitted from the sensor to the set-top box 12. The set-top box 12 includes an icon in the interactive portal meaning "REFRIGERATOR DOOR AJAR". A smoke detector 170 is another household amenity that is located in the kitchen 164. A sensor associated with the smoke detector 170 monitors the battery and sends an appropriate wireless signal to the set-top box 12 when the battery becomes low. Additionally, the sensor associated with the smoke detector 170 transmits a wireless signal when the smoke detector detects smoke. A smart speaker 48 is located on a counter top in the kitchen 164 to communicate with the set-top box 12 as previously discussed.

The second floor 154 of the house H includes a study 172, a hallway 174, and a bedroom 176. As illustrated, a computer 178 is located in the study 172. A sensor associated with the computer 178 sends a wireless signal to the set-top box 12 in response to receiving an e-mail. A telephone 180 is sitting on a stand in hallway 174. A sensor associated with the telephone 180 monitors for an incoming call and broadcasts a wireless signal in response thereto. The bedroom 176 includes an entry point or window 182 having a sensor associated with a security system. The sensor broadcasts a wireless signal in response to the detection of broken glass or the opening of the window 182, for example.

Similarly, the basement 156 includes a number of household amenities having sensors associated therewith that send wireless signals to the set-top box 12. A water shut-off box 184, a hot water heater 186, a washer and dryer 188, a meat freezer 190, and a sump pump 192 each have a sensor that detects the occurrence of an event. The sensor associated with the water shut-off box 184 may detect the condition of the water valve; namely open or closed. The sensor associated with the washer and dryer 188 alerts the television viewer when a load has finished washing or drying. The sensor associated with the meat freezer 190 detects an ajar door and the sensor associated with the sump pump 192 broadcasts a wireless signal upon detecting the presence of water.

The amenities found in yard 158 may also include sensors. A mailbox 194 may include a sensor that detects the opening and closing of the mailbox door in order to provide an indication that mail has arrived. Additionally, a pet bowl 196 may include a sensor that detects the emptying of the food in the bowl. The household amenities described herein encompass simple mailboxes to complex security systems. Accordingly, it should be appreciated that the home H utilizing the systems presented herein permits members of the household to monitor any technology that the household is inclined to implement. In particular, the sensors may monitor household amenities relating to the environment, family comfort, utilities, appliances, and security. By way of further example, the sensors may monitor the turning ON or OFF of particular lights, power usage, the opening and closing of a garage door, the turning ON and OFF of an iron, the freezing of a pipe, the presence of water leaks, the presence of gas or carbon monoxide (CO), temperature and humidity, the efficiency of an HVAC system, and the presence of smoke or fire. Additionally, the system for home awareness may provide schedule reminders, medical alerts, and the like.

It should be understood that although only one display, a television, is illustrated in FIG. 3, the systems and methods presented herein may be utilized in a multiple television or multiple display environment wherein a monitoring unit associated with each display receives all or a portion of the wireless signals from the sensors and provides the appropriate text messages. In one implementation, the computer 178 located in the study 172 has a monitoring unit connected therewith so that a user of the computer 178 is provided with home awareness.

Referring now to FIG. 4A, FIG. 4B, FIG. 4C and FIG. 5, as used herein, set-top boxes, back boxes and set-top/back boxes may be discussed as set-top boxes. By way of example, the set-top box 12 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. Such set-top boxes are used in cable television, satellite television, and over-the-air television systems, for example.

Figure 4A:
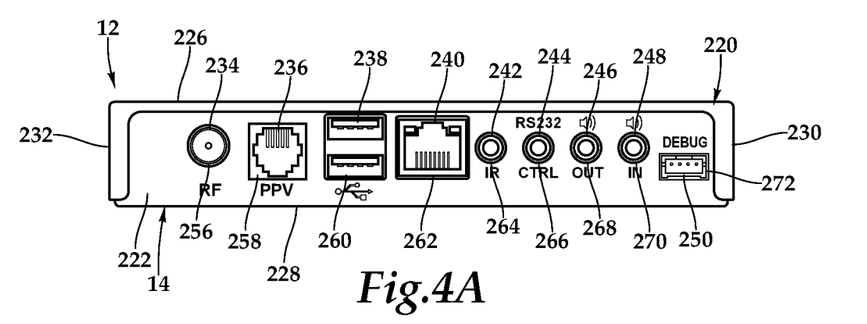
FIG. 4A is a front elevation view of one embodiment of a set-top box depicted in FIG. 1 in further detail.
Figure 4B:
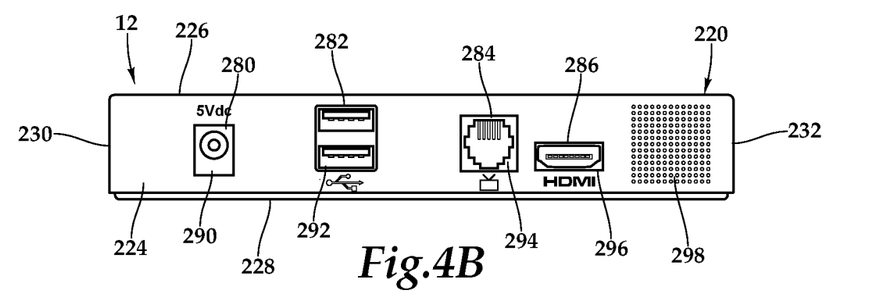
FIG. 4B is a rear elevation view of the set-top box depicted in FIG. 4A.
Figure 4C:
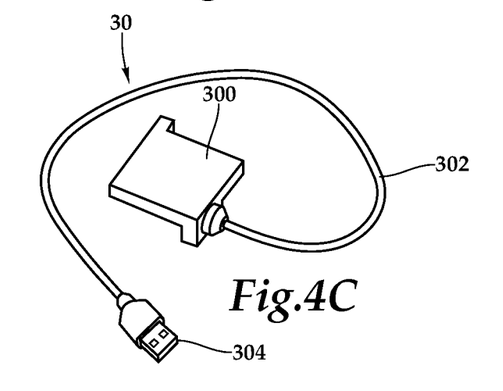
FIG. 4C is a front perspective view of a dongle depicted in FIG. 1 in further detail.

The set-top box 12 includes the housing 20 having a cover 220 having a rear wall 222, front wall 224, top wall 226, bottom base 228, and two sidewalls 230, 232. It should be appreciated that front wall, rear wall, and side wall are relative terms used for descriptive purposes and the orientation and the nomenclature of the walls may vary depending on application. The front wall includes various ports, ports 234, 236, 238, 240, 242, 244, 246, 248, and 250 that provide interfaces for various interfaces, including inputs and outputs. In one implementation, as illustrated, the ports 234 through 250 include inputs 252 and outputs 254 and, more particularly, an RF input 256, a RJ-45 input 258, universal serial bus (USB) input/outputs 260, an Ethernet category 5 (Cat 5) coupling 262, an internal reset 264, an RS232 control 266, an audio out 268, an audio in 270, and a debug/maintenance port 272. The front wall 224 also includes various inputs 252 and outputs 254. More particularly, ports 280, 282, 284, and 286 include a 5V dc power connection 290, USB inputs/outputs 292, an RJ-45 coupling 294, an HDMI port 296, and a microphone 298. It should be appreciated that the configuration of ports may vary with the set-top box depending on application and context. As previously alluded to, the housing 20 may include a housing-dongle combination including, with respect to the dongle 30, a unit 300 having a cable 302 with a set-top box connector 304 for selectively coupling with the set-top box 12.

Figure 5:
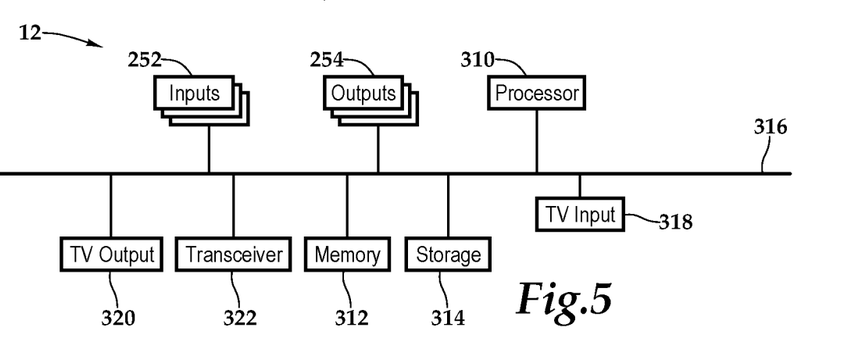
FIG. 5 is a functional block diagram depicting one embodiment of the set-top box presented in FIGS. 4A and 4B.

Within the housing 20, a processor 310, memory 312, storage 314, the inputs 252, and the outputs 254 are interconnected by a bus architecture 166 within a mounting architecture. It should be understood that the processor 310, memory 312, storage 314, the inputs 252, and the outputs 254 may be entirely contained within the housing 20 or the housing-dongle combination. The processor 310 may process instructions for execution within the computing device, including instructions stored in the memory 312 or in storage 314. The memory 312 stores information within the computing device. In one implementation, the memory 312 is a volatile memory unit or units. In another implementation, the memory 312 is a non-volatile memory unit or units. Storage 314 provides capacity that is capable of providing mass storage for the set-top box 12. The various inputs 252 and outputs 254 provide connections to and from the computing device, wherein the inputs 252 are the signals or data received by the set-top box 12, and the outputs 254 are the signals or data sent from the set-top box 12.

A content signal input 318 and a television output 320 are also secured in the housing 20 in order to receive content from a source in the hospitality lodging establishment and forward the content, including external content such as cable and satellite and pay-per-view (PPV) programming, to the television located within the hotel room. A transceiver 322 is associated with the set-top box 12 and communicatively disposed with the bus architecture 316. As shown the transceiver 322 may be internal, external, or a combination thereof to the housing 20. Further, the transceiver 322 may be a transmitter/receiver, receiver, or an antenna for example. Communication between various amenities in the environment E and the set-top box 12 may be enabled by a variety of wireless methodologies employed by the transceiver 322, including 802.11, 3G, 4G, Edge, WiFi, ZigBee, near field communications (NFC), Bluetooth low energy and Bluetooth, for example. Also, infrared (IR) may be utilized.

The memory 312 and storage 314 are accessible to the processor 310 and include processor-executable instructions that, when executed, cause the processor 310 to execute a series of operations. A configuration profile is associated with the storage 314 and the memory 312. The memory and processor-executable instructions enable the set-top box 12 to control multiple proximate amenities related to a user's stay in a lodging establishment in a multi-room environment, including the particular amenity to be controlled. Further, a database having multiple annotated service profiles may be stored in the storage 314 or the memory 312. Each of the annotated service profiles corresponds to the multiple proximate amenities and includes information relative to the service requests.

The processor-executable instructions cause the processor 310 to send via the television output 320 to the display 16, instructions for the interactive portal 50 and interactive icons 52 that are shown on the display 16. More particularly, the processor-executable instructions cause the processor 310 to receive a status signal via the transceiver 322 from an amenity. Then, the processor-executable instructions cause the processor 310 to access the configuration profile and determine a status icon relative to the status signal. As previously discussed, the status icon provides a description of the state of the amenity. Based on the processor-executable instructions, the processor 310 is caused to access the configuration profile and determine a management icon relative to the status signal. The management icon may include a service request which solicits an order, which in one implementation, the order may be a third-party order such as repair, maintenance, or product fulfillment. The processor-executable instructions then cause the processor 310 to generate an interactive portal 50 including the status icon and the management icon. The processor 310 then forwards the interactive portal 50 to the display 16 via the signal output and waits to receive an interactive instruction relative to the management icon. Upon receipt of the interactive instruction, the set-top box 12 executes.

During operation, the processor 310 may be caused to evaluate the spoken sequence of words $S_1$ by the individual I to assign a meaning to the spoken sequence of words $S_1$ and then generate the interactive instruction. With respect to a service request, the processor 310, following receipt of the interactive instruction, may send the set-top box a service request to the appropriate entity, or control an amenity with a command.

Figure 6:
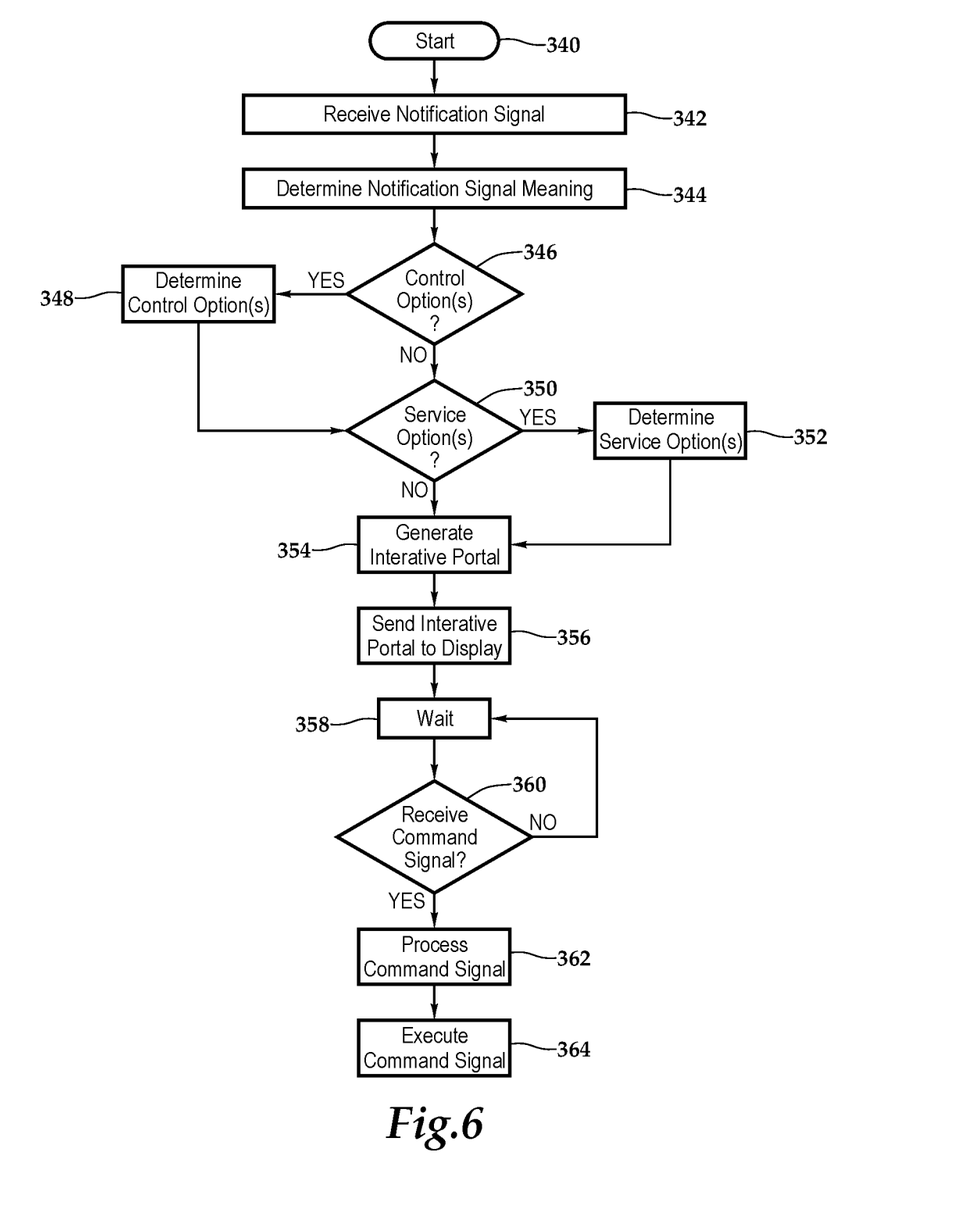
FIG. 6 is a flow chart depicting one embodiment of a method utilizing set-top boxes with interactive portals according to the teachings presented herein.

Referring now to FIG. 6, one embodiment of a method utilizing set-top boxes with interactive portals is depicted. At block 340, the methodology is initiated. At blocks 342 and 344 respectively, a notification signal is received at the set-top box and the meaning of the notification signal is determined. The notification signal may relate to a status of an amenity and a description of the state of the amenity as, in one embodiment, the set-top box is communicatively disposed with the amenity in order to, for example, receive status updates and send commands to control the amenity. At decision block 346, if control options are applicable to the signal received, then at block 348 control options are determined prior to advancing to decision block 350. On the other hand, if control options are not applicable, then the methodology advances to decision block 350. At decision block 350, the set-top box evaluates if service options are applicable. If service options are applicable, then the methodology advances to block 352 where the service options are determined before the methodology advances to block 354. If service options are not applicable, then the methodology advances to block 354. At block 354, an interactive portal is generated and then sent to the display at block 356. At block 358 the set-top box waits for a response and as shown by decision block 360, once a response is received by the set-top box as shown by decision blocks 362 and 364, the command signal is processed and executed.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A set-top box comprising:
a housing securing a signal input, a signal output, a processor, a transceiver, and memory therein;
a busing architecture communicatively interconnecting the signal input, the signal output, the transceiver, the processor, and the memory;
the signal input configured to receive a source signal from an external source, the source signal including a plurality of channels;
the signal output configured to forward a tuned signal to a display connected to the signal output, the signal being tuned from the source signal at the set-top box;
a configuration profile stored in the memory, the configuration profile enables the set-top box to control a plurality of proximate amenities;
the memory accessible to the processor, the memory including processor-executable instructions that, when executed, cause the processor to:
receive a status signal via the transceiver from an amenity, the amenity being one of the multiple proximate amenities,
generate an interactive portal based on the configuration profile, the interactive portal including a status icon and a management icon, the status icon being relative to the status signal, the management icon including a command request and a service request, the command request operates the amenity, the service request solicits a third-party order relative to the amenity selected from the group consisting of repair, maintenance, and product fulfillment,
forward the interactive portal to the display via the signal output, and
receive an interactive instruction relative to at least one of the plurality of management icons; and
the housing having storage therein, the storage communicatively interconnected with the busing architecture, the storage storing a database having a plurality of annotated service profiles, each of the plurality of annotated service profiles corresponding to the multiple proximate amenities, the plurality of annotated service profiles including information relative to the command request and service request.

2. The set-top box as recited in claim 1, wherein the status icon further comprises words.

3. The set-top box as recited in claim 1, wherein the status icon further comprises a graphical representation.

4. The set-top box as recited in claim 1, wherein the status icon further comprises a combination of words and a graphical representation.

5. The set-top box as recited in claim 1, wherein the management icon further comprises words.

6. The set-top box as recited in claim 1, wherein the management icon further comprises a graphical representation.

7. The set-top box as recited in claim 1, wherein the management icon further comprises a combination of words and a graphical representation.

8. The set-top box as recited in claim 1, wherein each of the plurality of proximate amenities is selected from the group consisting of lighting, security alarm systems, garage doors, front doors, hot-water heaters, sump pumps, door bells, pet bowls, HVAC systems, and entry points.

9. The set-top box as recited in claim 1, wherein each of the plurality of proximate amenities further comprises a single family residence amenity.

10. The set-top box as recited in claim 1, wherein each of the plurality of proximate amenities further comprises a multi-family residence amenity.

11. The set-top box as recited in claim 1, wherein the transceiver is configured to communicate with the plurality of proximate amenities via a standard selected from the group consisting of infrared (IR), 802.11, 3G, 4G, Edge, Wi-Fi, ZigBee, near field communications (NFC), Bluetooth, and Bluetooth low energy.

12. The set-top box as recited in claim 1, wherein the housing further comprises a housing-dongle combination securing the signal input, the signal output, the processor, memory, and storage therewith.

13. The set-top box as recited in claim 12, wherein the processor and the memory are distributed through the housing-dongle combination.

14. The set-top box as recited in claim 1, wherein the display is selected from the group consisting of televisions and electronic visual display devices.

15. The set-top box as recited in claim 1, wherein the status signal is received in response to an event at the amenity.

16. The set-top box as recited in claim 1, wherein the status signal is received in response to a periodic update transmitted by the amenity.

17. The set-top box as recited in claim 1, wherein the status signal is received in response to a status inquiry initiated by the set-top box.

18. A set-top box comprising:
a housing securing a signal input, a signal output, a processor, a transceiver, and memory therein;
a busing architecture communicatively interconnecting the signal input, the signal output, the transceiver, the processor, and the memory;
the signal input configured to receive a source signal from an external source, the source signal including a plurality of channels;
the signal output configured to forward a tuned signal to a display connected to the signal output, the signal being tuned from the source signal at the set-top box;
a configuration profile stored in the memory, the configuration profile enables the set-top box to control a plurality of proximate single family residence amenities, each of the proximate single family residence amenities being selected from the group consisting of lighting, security alarm systems, garage doors, front doors, hot-water heaters, sump pumps, door bells, pet bowls, HVAC systems, and entry points;
the memory accessible to the processor, the memory including processor-executable instructions that, when executed, cause the processor to:
receive a status signal via the transceiver from an amenity, the amenity being one of the multiple proximate amenities,
generate an interactive portal based on the configuration profile, the interactive portal including a status icon and a management icon, the status icon being relative to the status signal, the management icon being a service request relative to the amenity, the service request including a solicitation of a third-party order selected from the group consisting of repair, maintenance, and product fulfillment,
forward the interactive portal to the display via the signal output, and
receive an interactive instruction relative to at least one of the plurality of management icons; and
the housing having storage therein, the storage communicatively interconnected with the busing architecture, the storage storing a database having a plurality of annotated service profiles, each of the plurality of annotated service profiles corresponding to the multiple proximate amenities, the plurality of annotated service profiles including information relative to the service requests.

19. A set-top box comprising:
a housing securing a signal input, a signal output, a processor, a transceiver, and memory therein;
a busing architecture communicatively interconnecting the signal input, the signal output, the transceiver, the processor, and the memory;
the signal input configured to receive a source signal from an external source, the source signal including a plurality of channels;
the signal output configured to forward a tuned signal to a display connected to the signal output, the signal being tuned from the source signal at the set-top box;
a configuration profile stored in the memory, the configuration profile enables the set-top box to control a plurality of proximate multi-family family residence amenities, each of the proximate multi-family residence amenities being selected from the group consisting of lighting, security alarm systems, garage doors, front doors, hot-water heaters, sump pumps, door bells, pet bowls, HVAC systems, and entry points;
the memory accessible to the processor, the memory including processor-executable instructions that, when executed, cause the processor to:
receive a status signal via the transceiver from an amenity, the amenity being one of the multiple proximate amenities,
generate an interactive portal based on the configuration profile, the interactive portal including a status icon and a management icon, the status icon being relative to the status signal, the management icon being a service request relative to the amenity, the service request including a solicitation of a third-party order selected from the group consisting of repair, maintenance, and product fulfillment,
forward the interactive portal to the display via the signal output, and
receive an interactive instruction relative to at least one of the plurality of management icons; and
the housing having storage therein, the storage communicatively interconnected with the busing architecture, the storage storing a database having a plurality of annotated service profiles, each of the plurality of annotated service profiles corresponding to the multiple proximate amenities, the plurality of annotated service profiles including information relative to the service requests.

* * * * *